United States Patent
Zappaterra et al.

(10) Patent No.: US 9,967,888 B1
(45) Date of Patent: May 8, 2018

(54) SELECTIVE MICRO-TRANSMISSION IN DOWNLINK CONTROL INFORMATION (DCI) MESSAGE

(71) Applicant: Sprint Spectrum L.P., Overland Park, KS (US)

(72) Inventors: Luca Zappaterra, Arlington, VA (US); Yu Zhou, Herndon, VA (US); Muhammad A. Naim, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 158 days.

(21) Appl. No.: 15/073,263

(22) Filed: Mar. 17, 2016

(51) Int. Cl.
*H04W 72/04* (2009.01)
*H04W 4/00* (2009.01)
*H04L 12/26* (2006.01)

(52) U.S. Cl.
CPC ......... *H04W 72/0486* (2013.01); *H04L 43/16* (2013.01); *H04W 4/005* (2013.01); *H04W 72/042* (2013.01)

(58) Field of Classification Search
CPC .................. H04W 4/005; H04W 28/0215
See application file for complete search history.

(56) References Cited

U.S. PATENT DOCUMENTS

| 2008/0194224 | A1 | 8/2008 | Thorson et al. | |
| 2011/0299492 | A1* | 12/2011 | Lee | H04W 4/00 370/329 |
| 2013/0077484 | A1 | 3/2013 | Zhao et al. | |
| 2013/0102342 | A1* | 4/2013 | Tesanovic | H04B 7/0623 455/507 |
| 2013/0215851 | A1* | 8/2013 | Sato | H04L 5/0007 370/329 |
| 2014/0204819 | A1* | 7/2014 | Ohta | H04L 5/0053 370/311 |
| 2015/0003384 | A1* | 1/2015 | Kawasaki | H04W 72/042 370/329 |
| 2015/0009952 | A1* | 1/2015 | Berggren | H04W 72/042 370/330 |
| 2015/0023281 | A1* | 1/2015 | Wu | H04W 52/146 370/329 |

(Continued)

FOREIGN PATENT DOCUMENTS

WO WO 2013029534 A1 * 3/2013 .......... H04W 72/042

OTHER PUBLICATIONS

Rapeepat Ratasuk et al., "Recent Advancements in M2M Communications in 4G Networks and Evolution Toward 5G,".

(Continued)

*Primary Examiner* — Kashif Siddiqui

(57) ABSTRACT

When a base station has just a small amount of data to transmit to a served UE, the base station will transmit the data to the UE in a DCI message on a PDCCH, rather than using the DCI message to allocate PDSCH resources to carry the data and transmitting the data on the allocated PDSCH resources. Further, the base station could advantageously make use of a standard DCI message format but could transmit the data in DCI message fields that would otherwise be used to allocate PDSCH resources or otherwise to facilitate PDSCH transmission, since those DCI message fields would not be needed when the data is transmitted in the DCI message itself.

20 Claims, 8 Drawing Sheets

(56) References Cited

U.S. PATENT DOCUMENTS

| | | | |
|---|---|---|---|
| 2015/0030091 A1* | 1/2015 | El-Najjar | H04B 7/0413 375/267 |
| 2015/0124773 A1* | 5/2015 | Wu | H04W 72/042 370/329 |
| 2017/0135098 A1* | 5/2017 | Kang | H04W 4/005 |
| 2017/0201982 A1* | 7/2017 | Rico Alvarino | H04W 72/042 |

OTHER PUBLICATIONS

Chinese Publication No. CN103327639, published on Sep. 25, 2013 (Google machine translation).

* cited by examiner

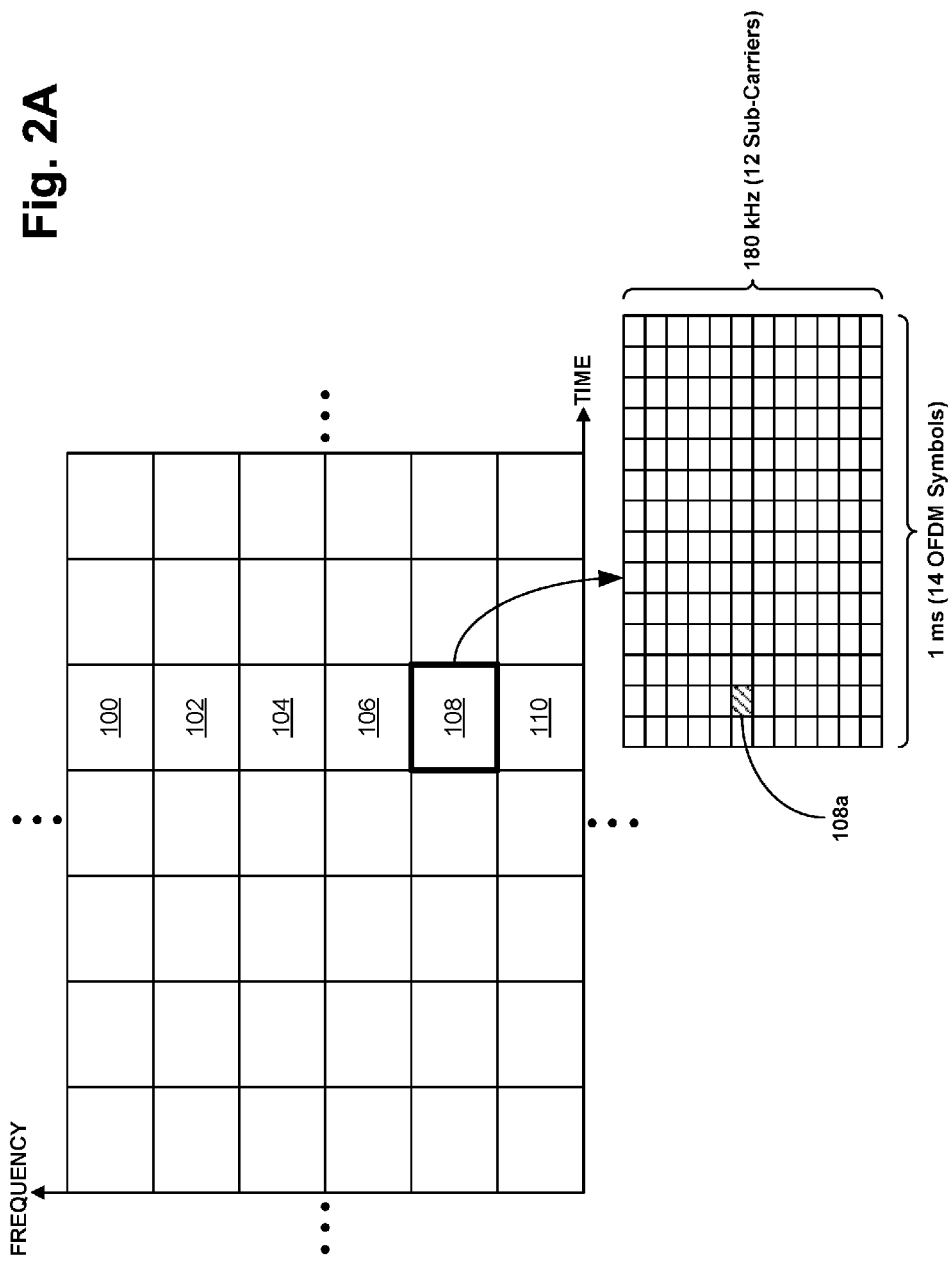

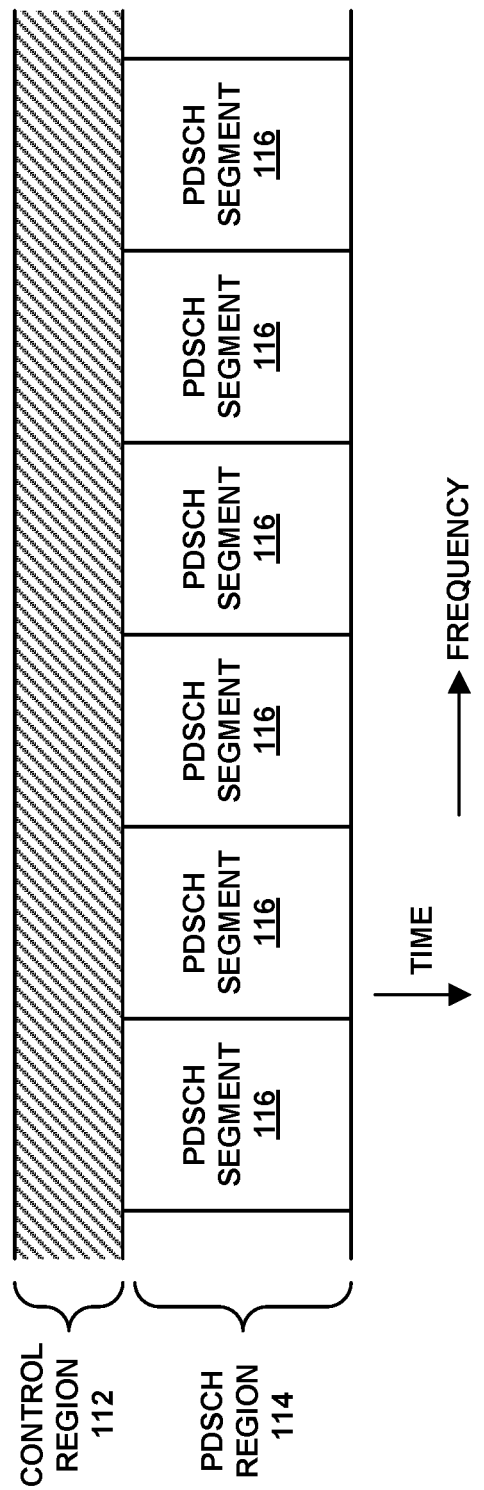

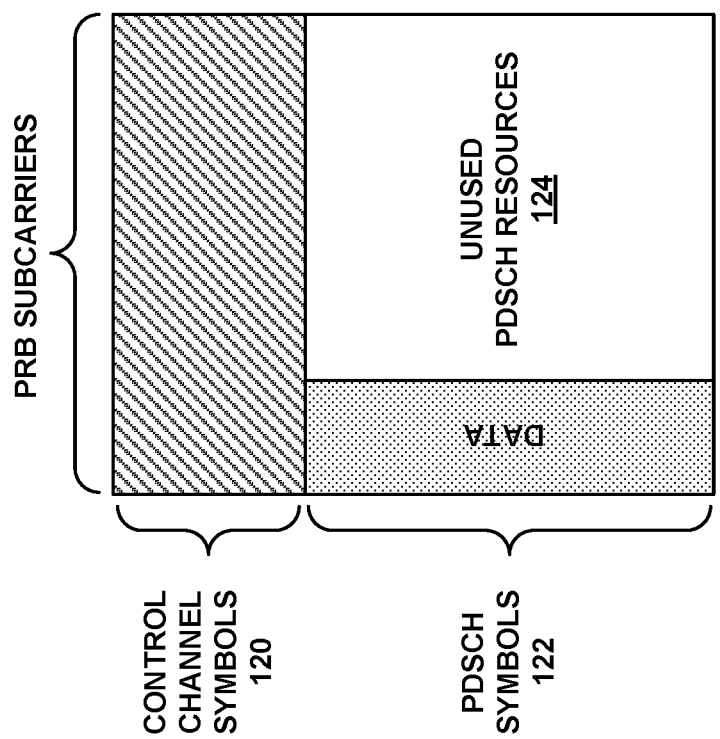

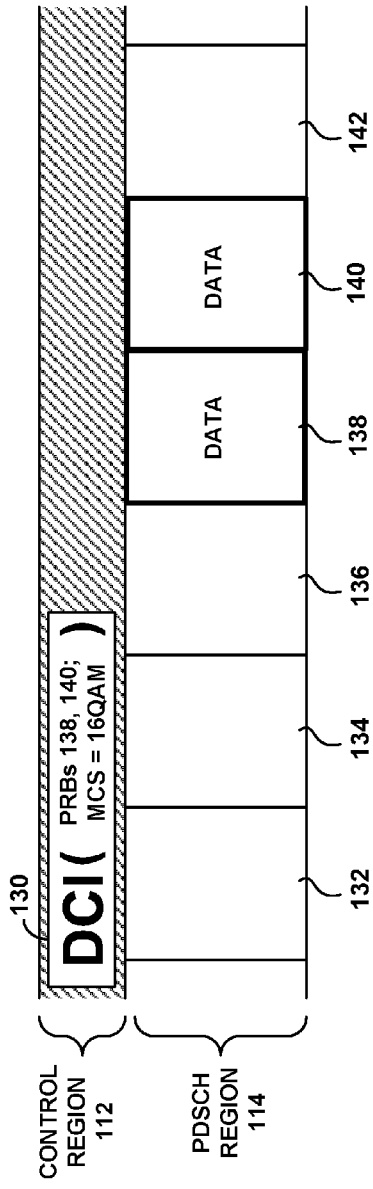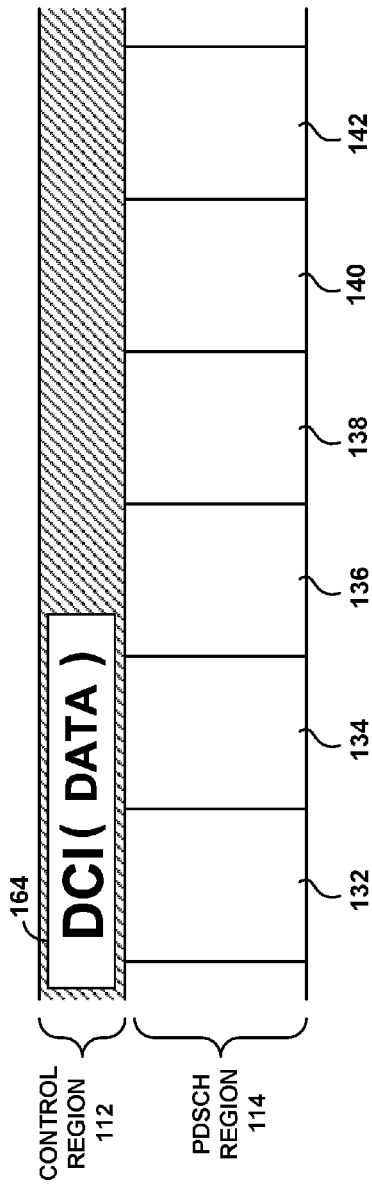

SELECTIVE MICRO-TRANSMISSION IN DOWNLINK CONTROL INFORMATION (DCI) MESSAGE

BACKGROUND

Unless otherwise indicated herein, the description provided in this section is not prior art to the claims and is not admitted to be prior art by inclusion in this section.

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user). In general, each coverage area may operate on one or more carriers each defining a respective bandwidth of coverage, and each coverage area may define an air interface providing a downlink for carrying communications from the base station to UEs and an uplink for carrying communications from UEs to the base station. The downlink and uplink may operate on separate carriers or may be time division multiplexed over the same carrier(s). Further, the air interface may define various channels for carrying communications between the base station and UEs. For instance, the air interface may define one or more downlink traffic channels and downlink control channels, and one or more uplink traffic channels and uplink control channels.

In accordance with the Long Term Evolution (LTE) standard of the Universal Mobile Telecommunications System (UMTS), for instance, each coverage area of a base station may operate on one or more carriers spanning 1.4 MHz, 3 MHz, 5 MHz, 10 MHz, 15 MHz, or 20 MHz. On each such carrier used for downlink communications, the air interface then defines a Physical Downlink Shared Channel (PDSCH) as a primary channel for carrying data from the base station to UEs, and a Physical Downlink Control Channel (PDCCH) for carrying control signaling from the base station to UEs. Further, on each such carrier used for uplink communications, the air interface defines a Physical Uplink Shared Channel (PUSCH) as a primary channel for carrying data from UEs to the base station, and a Physical Uplink Control Channel (PUCCH) for carrying control signaling from UEs to the base station.

In LTE, downlink air interface resources are mapped in the time domain and in the frequency domain. In the time domain, LTE defines a continuum of 10 millisecond (ms) frames, divided into 1 ms sub-frames and 0.5 ms slots. With this arrangement, each sub-frame is considered to be a transmission time interval (TTI). Thus, each frame has 10 TTIs, and each TTI has 2 slots. In the frequency domain, resources are divided into groups of 12 sub-carriers. Each sub-carrier is 15 kHz wide, so each group of 12 sub-carriers occupies a 180 kHz bandwidth. The 12 sub-carriers in a group are modulated together, using orthogonal frequency division multiplexing (OFDM), to form one OFDM symbol.

LTE further defines a particular grouping of time-domain and frequency-domain resources as a downlink physical resource block (PRB). In the time domain, each downlink PRB has a duration corresponding to one sub-frame (1 ms). In the frequency domain, each downlink PRB consists of a group of 12 sub-carriers that are used together to form OFDM symbols. Typically, the 1 ms duration of a downlink PRB accommodates 14 OFDM symbols, each spanning 66.7 microseconds, with a 4.69 microsecond guard band (cyclic prefix) added to help avoid inter-symbol interference. Depending on the bandwidth of the downlink carrier, the air interface may support transmission on a number of such downlink PRBs in each TTI. For instance, a 5 MHz carrier supports 25 PRBs in each TTI, whereas a 15 MHz carrier supports 75 PRBs in each TTI.

The smallest unit of downlink resources is the resource element. Each resource element corresponds to one sub-carrier and one OFDM symbol. Thus, a PRB that consists of 12 sub-carriers and 14 OFDM symbols has 168 resource elements. Further, each resource element can represent a number of bits, with the number of bits depending on how the data is modulated. For instance, with Quadrature Phase Shift Keying (QPSK) modulation, each resource element may represent 2 bits; with 16 Quadrature Amplitude Modulation (16QAM), each resource element may represent 4 bits; and with 64QAM, each resource element may represent 6 bits.

Within a PRB, and cooperatively across all of the PRBs of the carrier bandwidth, different resource elements can have different functions. In particular, a certain number of the resource elements (e.g., 8 resource elements distributed throughout the resource block) may be reserved for reference signals used for channel estimation, and certain resource elements in designated subframes may be reserved to carry synchronization signals or broadcast channels. In addition, a certain number of the resource elements (e.g., resource elements in the first one, two, or three OFDM symbols of each downlink TTI) may be reserved for the PDCCH and other control channels, and most of the remaining resource elements (e.g., most of the resource elements in the remaining OFDM symbols of the TTI) would be left to define the PDSCH.

Across the carrier bandwidth, each downlink TTI of the LTE air interface thus defines a control region or PDCCH region that generally occupies a certain number of 66.7 microsecond symbol time segments (e.g., one, two, or three such symbol time segments), and a PDSCH region that generally occupies the remaining symbol time segments, with certain exceptions for particular resource elements. With this arrangement, in the frequency domain, the PDCCH region and PDSCH region both span the entire carrier bandwidth. In practice, the control region is then treated as being a bandwidth-wide space for carrying control signaling to UEs. Whereas, the PDSCH region is treated as defining discrete 12-subcarrier-wide PDSCH segments corresponding to the PRB definitions across the carrier bandwidth.

One of the main functions of the PDCCH in LTE is to carry "Downlink Control Information" (DCI) messages to served UEs. LTE defines various types or "formats" of DCI messages, to be used for different purposes, such as to indicate how a UE should receive data in the PDSCH of the current TTI, or how the UE should transmit data on the PUSCH in an upcoming TTI. For instance, DCI message in a particular TTI generally schedules downlink communication of bearer data to a particular UE (i.e., a UE-specific data transmission), by specifying one or more PRBs in the current TTI whose usable PDSCH resource elements carry the bearer data, what modulation scheme is used for bearer data in the specified PRB(s), and so forth.

Each DCI message may span a particular set of resource elements on the PDCCH (e.g., one, two, four, or eight control channel elements (CCEs), each including 36 resource elements) and may include a cyclic redundancy check (CRC) that is masked (scrambled) with an identifier (e.g., cell radio network temporary identifier (C-RNTI))

assigned to the UE, so that the UE can identify and read the DCI message. Further, the DCI message may be modulated using QPSK modulation. In practice, a UE may monitor the PDCCH in each TTI in search of a DCI message destined to the UE. In particular, the UE may engage in a "blind decoding" process in which the UE reads various candidate groups of resource elements on the PDCCH in search of a DCI message masked with the UE's identifier. If the UE finds such a DCI message, the UE may then read that DCI message and proceed as indicated. For instance, if the DCI message schedules downlink communication of bearer data to the UE in particular PRBs of the current TTI, the UE may then read the data carried by the PDSCH resource elements of the indicated PRB(s), to receive that bearer data.

OVERVIEW

In a system as described above, the smallest air-interface unit that a base station can assign for transmission of data to a UE in a given TTI may be a PRB corresponding to one 12-subcarrier-wide segment of the carrier bandwidth and the symbol time segments of the PDSCH region (excluding the resource elements used for reference signal transmission). When a base station has data to transmit to a UE in a particular TTI, the base station may thus assign for the transmission one or more such PRBs in that TTI, sufficient to carry the data using whatever modulation scheme the base station plans to use for the transmission. In particular, as noted above, the base station may (i) transmit on the PDCCH of the TTI a DCI message to the UE, specifying in the DCI message the assigned PRB(s) and the modulation scheme that will be used and (ii) transmit the data in the PDSCH resource elements of the specified PRB(s), and the UE may respond to that DCI message by reading the data from the PDSCH resource elements of the specified PRB(s).

An issue that can arise with this arrangement, however, is that the data the base station seeks to transmit to a UE in a particular TTI may not fill all of the PDSCH resource elements of an assigned PRB. For instance, if a PRB has 120 PDSCH resource elements that could be used to carry data to a UE, and if the transmission would use QPSK modulation, then the PRB could carry up to 240 bits of data. (Further, depending on the coding rate, a portion of these 240 bits could be redundancy coding rather than useful data.) But if a base station has fewer than 240 bits (including redundancy bits) to transmit to a UE in a given TTI and the base station allocates a PRB for the transmission, some of the resource elements in the allocated PRB may go unused, which is inefficient.

This may be a particular issue with machine-type communications (MTC) and the "Internet of Things" (IoT), where numerous devices ("things") communicate with each other, often through wireless connections, and often sending just very small data packets for purposes such as conveying binary commands, requests, reports, and the like. Although IoT communication can use short-range wireless connections, such WIFI and ZIGBEE connections, between the communicating devices, IoT communication can also occur via cellular connections, such as LTE networks. In that arrangement, every time a small MTC packet gets transmitted to a device served by an LTE network, an LTE base station serving that device may need to allocate a downlink PRB to carry the MTC packet. But the MTC packet might use just small part of the allocated PRB, leaving many PDSCH resource elements unused.

Disclosed herein is a mechanism to help address this issue. In accordance with the disclosure, when a base station has just a small amount of data to transmit to a served UE, the base station will transmit the data to the UE in a DCI message on the PDCCH, rather than using the DCI message to allocate PDSCH resources to carry the data and transmitting the data on the allocated PDSCH resources. Further, the base station could advantageously make use of a standard DCI message format but could transmit the data in DCI message fields (or in place of DCI message fields) that would otherwise be used to allocate PDSCH resources or otherwise to facilitate PDSCH transmission, since those DCI message fields would not be needed for any PDSCH resource allocation.

In practice, for instance, the base station could determine the amount of data that the base station has for transmission to a UE, and the base station could compare the determined amount with a threshold. The threshold could be defined as the quantity of data that could be carried in the DCI message on the PDCCH, for example. If the base station thereby concludes that the determined amount of data is greater than the threshold, then the base station could responsively allocate PDSCH resources for transmission of the data, send a DCI message that specifies the allocated PDSCH resources, and transmit the data accordingly in the allocated PDSCH resources. Whereas, if the base station thereby concludes that the determined amount of data is less than (e.g., less than or equal to) the threshold, then the base station could responsively not allocate PDSCH resources for transmission of the data but instead send the data in a DCI message on the PDCCH.

Accordingly, in one respect, disclosed is a method for controlling transmission in a TTI, in a wireless communication system where a base station is configured to serve UEs via an air interface that spans a frequency bandwidth and that defines over time a sequence of TTIs, and where each TTI defines a PDSCH and a PDCCH. Per the disclosure, when the base station has an amount of data for transmission over the air interface to a UE, the base station transmits a DCI message to the UE on the TTI's PDCCH. Further, based on a comparison between the amount of data and a threshold amount, the base station selects between (i) transmitting the data on allocated resources of the TTI's PDSCH and specifying in the DCI message the allocated PDSCH resources, to enable the UE to read the data from the specified PDSCH resources, and (ii) transmitting the data within the DCI message, rather than on the TTI's PDSCH, to enable the UE to read the data from the DCI message. And the base station operates in accordance with that selection.

In another respect, the disclosed method involves the base station comparing the amount of data with a threshold amount, where the threshold amount could be set based on capacity of the DCI message. Further, the method could then involve the base station controlling transmission of the data to the UE, based on the comparing, and particularly (a) if the amount of data is greater than the threshold amount, then (i) allocating resources of the TTI's PDSCH for carrying the data, (ii) specifying in the DCI message the allocated PDSCH resources, and (iii) transmitting the data to the UE on the allocated PDSCH resources, but (b) if the amount of data is less than or equal to the threshold, then not allocating resources of the TTI's PDSCH for carrying the data, and transmitting the data to the UE in the DCI message rather than on the TTI's PDSCH.

Still further, in another respect, disclosed is a base station configured to serve UEs via an air interface that spans a frequency bandwidth and that defines over time a sequence of TTIs, with each TTI defining a PDSCH and a PDCCH. Per the disclosure, the base station includes an antenna structure for transmitting and receiving communications on the air interface, and a controller configured to control air interface transmission by the base station. In this configuration, when the base station has an amount of data to transmit over the air interface to a UE in a TTI, the controller causes the base station to transmit to the UE on the TTI's PDCCH a DCI message. Further, based on a comparison between the amount of data and a threshold amount, the controller makes a selection between (i) causing the base station to transmit the data on allocated resources of the TTI's PDSCH and to specify in the DCI message the allocated PDSCH resources, so as to enable the UE to read the data from the specified PDSCH resources, and (ii) causing the base station to transmit the data within the DCI message, rather than on the TTI's PDSCH, so as to enable the UE to read the data from the DCI message. And the controller causes the base station to operate in accordance with the selection.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 2A is an illustration of a division of a shared downlink channel into downlink resource blocks, in accordance with an example embodiment.

FIG. 2C is an illustration of a segment of a downlink TTI, depicting a relationship between control channel space and PDSCH space.

FIG. 3 illustrates a resource block that is just partially filled and thus has unused PDSCH resources.

FIG. 4A illustrates an example TTI in an instance where the eNodeB uses a DCI message to schedule PDSCH transmission of data to a UE.

FIG. 4B illustrates an example TTI in an instance where the eNodeB transmits data within a DCI message rather than using the DCI message to schedule PDSCH transmission of the data.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
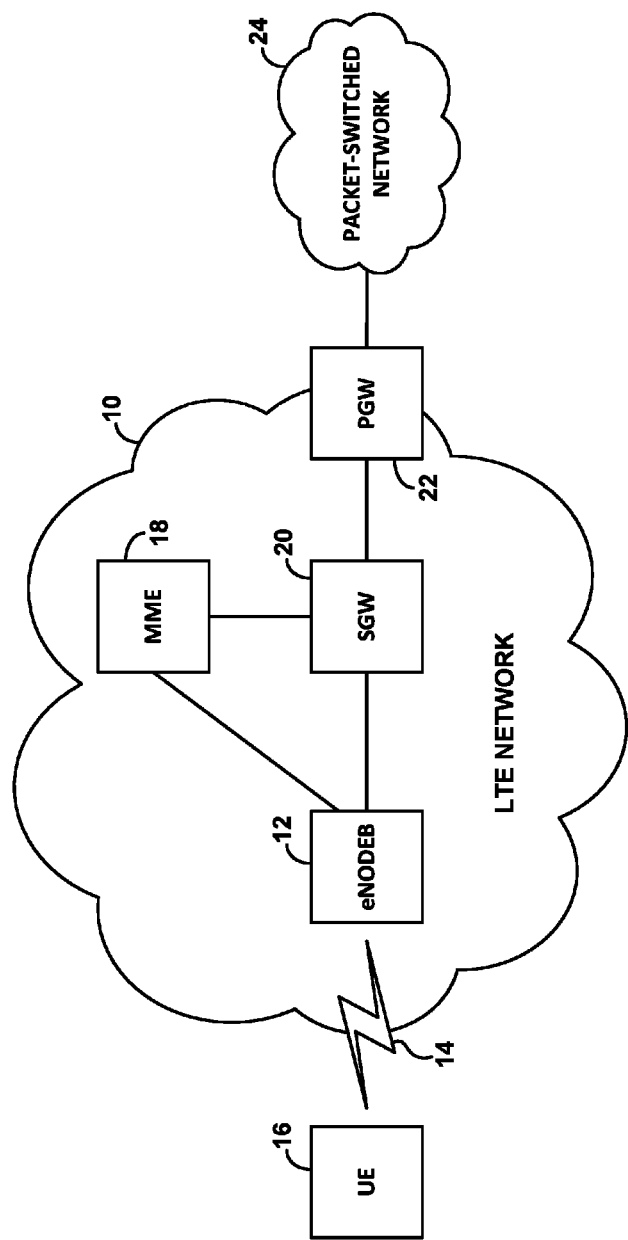
FIG. 1 is a simplified block diagram of a wireless communication system in which the present method and apparatus can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs with wireless packet data communication service, including possibly voice-over-packet service, but may also provide other functions. As shown, the LTE network includes an eNodeB 12, which has an antenna structure and associated equipment for providing an LTE coverage area (air interface) 14 in which to serve UEs such as an example UE 16 as shown. The eNodeB 12 then has a communication interface with a mobility management entity (MME) 18 that functions as a signaling controller for the LTE network. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20. In practice, the illustrated components of the LTE network may sit as nodes on a private packet-switched network owned by an operator of the LTE network, and thus the various communication interfaces may be logical interfaces through that network.

With this arrangement as shown, the UE 16 may be attached (i.e., registered) with the eNodeB 12 on a particular carrier, such a particular carrier having a defined frequency bandwidth and structure as described above, and the UE may have one or more established bearers for carrying bearer data between the UE and packet-switched network 24. In such an arrangement, the eNodeB 12 may at times receive, from SGW 20 or other source, packet-data that is destined to the UE, and the eNodeB may buffer that data for transmission to the UE. The eNodeB 12 may then assign one or more PRBs to carry that data to the UE in a particular TTI and may thus transmit to the UE a DCI specifying that PRB assignment, and transmit the data to the UE in the assigned PRB(s).

FIG. 2A illustrates how the downlink resources in the eNodeB's coverage area 14 may be divided in time and frequency domains into PRBs under LTE. In the time domain, each PRB occupies a 1 ms TTI. By way of example, FIG. 2A shows PRBs 100-110 for a particular TTI. In the frequency domain, each of PRBs 100-110 occupies a respective portion of frequency bandwidth, typically 180 kHz. Although FIG. 2A shows six PRBs in each TTI, a wireless coverage area could have a greater number of PRBs, as indicated by the dots above and below PRBs 100-110. As noted above, for instance, in a 5 MHz LTE carrier, a total of 25 PRBs may span the bandwidth in each 1 ms TTI.

FIG. 2A also includes a more detailed view of downlink PRB 108. This detailed view shows that the 180 kHz of frequency bandwidth corresponds to 12 sub-carriers of 15 kHz each, and also shows that the 1 ms TTI corresponds to the duration of 14 OFDM symbols. Each OFDM symbol spans the 12 sub-carriers and includes a respective sub-carrier symbol on each sub-carrier. Thus, as noted above, a downlink PRB may be described as a set of resource elements, with each resource element corresponding to a sub-carrier symbol that is carried on a particular sub-carrier for the duration of one OFDM symbol. The detailed view of downlink resource block 108 in FIG. 2A shows the division of the PRB into multiple resource elements, such as resource element 108*a*.

Figure 2B:
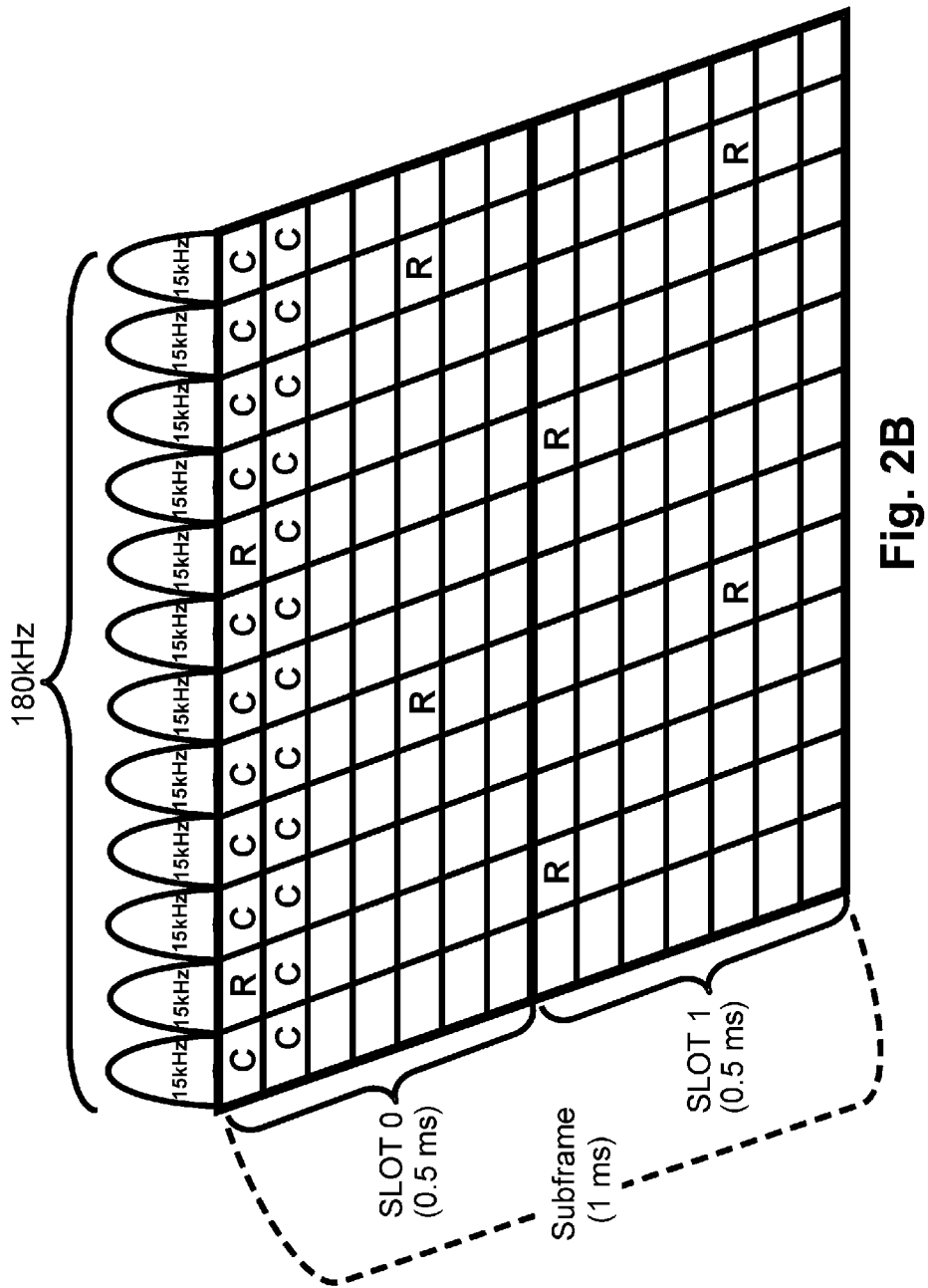
FIG. 2B is an illustration of a downlink resource block, in accordance with an example embodiment.

As further noted above, different resource elements in a downlink PRB may be used for different purposes. FIG. 2B illustrates different functions among the 168 resource elements in an example downlink resource block. In this example, 8 of the resource elements are labeled "R" to indicate that they are reserved for reference signals used for channel estimation. In addition, 22 of the resource elements in the first two OFDM symbols are labeled "C" to indicate that they are used to transmit control signaling (including, for instance, the PDCCH). The other 138 resource elements that are unlabeled could be used to define the PDSCH for transmitting bearer data and other scheduled transmissions. It is to be understood that FIG. 2B illustrates only one possible configuration, and that a downlink resource block could have other configurations as well.

FIG. 2C next depicts a segment of an example downlink TTI, to help illustrate the example relationship between the control region and the PDSCH region across the bandwidth of a representative carrier. In particular, FIG. 2C provides another view of the six example resource blocks 100-110 of FIG. 2A. As shown, a first portion of time (one or more OFDM symbol time segments) of each resource block is reserved for use to define control channel space 112 that spans all of the resource blocks in the TTI. The remaining portion of each resource block (other than resource elements reserved as reference symbols or for other use) is then available for use to define PDSCH space 114, divided into a series of PDSCH segments 116 corresponding with 12-subcarrier wide PRBs.

When a UE is served on this carrier and the eNodeB has data to transmit to the UE in a particular TTI (e.g., per scheduling by the eNodeB), the eNodeB may normally assign one or more of the PDSCH segments in the TTI to carry the data to the UE. (In practice, the eNodeB may assign one or more PRBs, but practically speaking, it is the PDSCH segment portion of each such resource block that is being assigned to carry data to the UE, since the control channel portion of each such resource block is really just part of the bandwidth-wide control channel space.) In that TTI, the eNodeB may then normally transmit the data in the assigned PDSCH segment(s) and transmit to the UE in the PDCCH of the control channel space 112 a DCI message that specifies the PDSCH segment(s) carrying the data. Through blind decoding as discussed above, the UE may then find and read that DCI message on the PDCCH and responsively read the transmitted data from the specified PDSCH segment(s). The UE may then pass that data through various logical layers of the UE, ultimately arriving at an application layer for processing.

As noted above, LTE defines various formats of DCI messages, with each format having defined fields for carrying bits representing particular control information. One such format used for PDSCH resource allocation is DCI Format 1, illustrated in Table 1.

TABLE 1

(DCI Format 1)

| Bits | Field |
| --- | --- |
| 1 | Resource Allocation Header (Type 0 or 1) |
| Var | Resource Assignment |
| 5 | Modulation and Coding Scheme |
| 3 or 4 | HARQ Process (3 for FDD, 4 for TDD) |
| 1 | New Data Indicator |
| 2 | Redundancy Version |

TABLE 1-continued (DCI Format 1)

| Bits | Field |
| --- | --- |
| 2 | Uplink Power Control (PUCCH) |
| 2 | Downlink Assignment Index: TDD |

In this DCI format, the Resource Allocation Header field carries a single bit specifying either type 0 or type 1, each being a different type of bit-mapping that the Resource Assignment field will then use to designate the assigned PRBs. Type 0 provides a simple bit mapping, where each bit in the Resource Assignment field corresponds with a respective Resource Block Group (RBG) in the bandwidth, with the number of PRBs per RBG depending on the bandwidth. Type 1 provides a more complex bit mapping, where the Resource Assignment field includes an RBG subset value that specifies which RBGs are at issue, the bit mapping then specifies which PRBs in that RBG subset are being assigned, and the number of RBG subsets is equal to the number of PRBs in each RBG.

The Resource Assignment field then carries a number of bit specifying the PRB assignment, with bits mapped to the PRB assignment per the bit-mapping defined by the Resource Allocation Header. With Type 1 allocation on a 10 MHz carrier, for instance, 2 bits are used to specify the RBG subset and 14 bits are used to specify which PRBs in the RBG subset are being assigned. Whereas, with Type 1 allocation on a 20 MHz carrier, 2 bits are used to specify the RBG subset, and 25 bits are used to specify which PRBs in the RBG subset are being assigned.

The Modulation and Coding Scheme field then carries 5 bits indicating the modulation and coding scheme (MCS) for the data transmission in the specified PRB(s). In practice, the eNodeB may select the MCS based on channel-quality reporting from the UE. In particular, the UE may periodically report to the eNodeB a channel quality indication (CQI) value based on the UE's evaluation of channel conditions (e.g., receive signal strength, radio type, etc.), and the eNodeB may apply a standard mapping table to map that CQI to an appropriate MCS. Pursuant to the mapping table, poor channel quality would map to a low order MCS (e.g., QPSK) that would have each resource element representing fewer data bits, and good channel quality would map to a higher order MCS (e.g., 64QAM) that would have each resource element representing more data bits.

The HARQ Process Number field then carries 3 or 4 bits used to specify a hybrid-automatic-repeat-request (HARQ) process number, used for data re-transmission. The New Data Indicator field carries 1 bit specifying whether the transmission is a fresh transmission or a re-transmission, and the Redundancy Version field carries 2 bits specifying redundancy information included in the transmission. Further, the Uplink Power Control field then carries 2 bits used to provide for power control on the PUCCH. And the Downlink Assignment Index field is a TDD-specific field carries 2 bits that indicate a count of downlink assignments scheduled for the UE in the subframe.

Other DCI formats could be arranged with different defined fields, possibly carrying other control information. Further, new DCI formats could be defined.

In practice as the eNodeB 12 serves a UE such as UE 16, the eNodeB may receive (e.g., from SGW 20) or otherwise have data for transmission to the UE in a TTI. The eNodeB may then allocate resources of the TTI's PDSCH (e.g., one or more particular PRBs) to carry the data, and the eNodeB may (i) generate and transmit on the TTI's PDCCH a DCI message specifying the PDSCH resource allocation, specifying modulation and coding scheme, and providing other control information as noted above, and (ii) transmit the data accordingly on the specified PDSCH resources using the specified modulation and coding scheme. When the UE receives the transmission on that TTI, the UE may then engage in blind decoding on the PDCCH to find and read the DCI message, and the UE may responsively demodulate and process the data transmitted on the specified PDSCH resources in the TTI.

As noted above, there may be instances where the eNodeB has just a small amount of data (e.g. bearer data) to transmit to the UE, and where transmission of that small amount of data may leave a fair amount of excess space in an assigned PRB. For example, as noted above, the eNodeB may receive an MTC packet for transmission to the UE, and the MTC packet may be on the order of 10 or so bits, yet transmitting that MTC packet in the smallest allocable PDSCH resource of one PRB might consume just a handful of resource elements, inefficiently leaving many other resource elements of the PRB unused. As another example, there could be an instance where the eNodeB has data buffered for transmission to a UE and where some of the data fills an integral number of PRBs with but where there is a remaining amount of data that would fill only part of a PRB and would thus inefficiently leave many resource elements of that PRB unused.

FIG. 3 depicts a representative PRB, showing an example of such unused capacity in the associated PDSCH segment. In particular, as shown in FIG. 3, the resource block includes control channel symbols 120 and PDSCH symbols 122. The illustrated control channel symbols 120 would define a portion of the control channel space 112 in the TTI at issue, and the PDSCH symbols 122 would define an example PDSCH segment in the TTI at issue. As shown, the PDSCH segment contains an amount of data to be transmitted to a particular UE, but has significant unused capacity 124. This figure shows the unused capacity as being perhaps a number of subcarriers of the PDSCH segment. However, the unused capacity could be situated elsewhere or in another manner in the PDSCH segment, as a number of unused PDSCH resource elements.

As noted above, to help improve efficiency, the eNodeB could instead transmit such a small amount of data within a DCI message on the PDCCH, rather than scheduling PDSCH resources to carry the data. To facilitate this, the eNodeB could transmit the data in one or more defined fields of the DCI message that would otherwise be used to schedule PDSCH transmission or for other purposes, and the eNodeB could provide an indication in the DCI message that the DCI carries data, so that a UE correspondingly programmed could then detect the indication and read the data directly from the DCI message rather than reading the DCI message to determine allocated PDSCH resources and reading the data from the allocated PDSCH resources.

Various DCI formats may have different extents of capacity to facilitate this. Considering DCI Format 1 as discussed above, for instance, the eNodeB could specify in the Resource Allocation Header field that the resource allocation is Type 1, so as to enable the more complex bit-mapping in the Resource Assignment field. The eNodeB could then specify in the Resource Assignment field a special RBG subset value to indicate that the DCI message carries bearer data rather than a PDSCH resource allocation. And the eNodeB could then use the bits of the Resource Assignment field that would normally carry the PRB assignment bit-mask to instead carry at least some of the data to the UE. Further, as the eNodeB would not be scheduling transmission of the data on the PDSCH, the eNodeB need not provide a MCS designation, and so the eNodeB could also use the bits of the Modulation and Coding Scheme field to carry at least some of the data to the UE as well.

Still further, in some implementations (e.g., for MTC packet transmission), HARQ may not be applied for such small data transmission, in which case the eNodeB could use the bits of the HARQ-related fields such as HARQ Process Number, New Data Indicator, and Redundancy Version fields to carry at least some of the data to the UE. And likewise, in some implementations, uplink power control might not be applied, in which case the eNodeB could use the bits of the Uplink Power Control field to carry at least some of the data to the UE. Still further, in an FDD implementation or if otherwise appropriate, the eNodeB could use the bits of the Downlink Assignment Index field to carry at least some of the data to the UE.

Overall with these fields of a Format 1 DCI message on a 10 MHz carrier, the eNodeB could thus potentially provide approximately 29 bits of data transmission in the DCI message. Or with these fields of a Format 1 DCI message on a 20 MHz carrier, the eNodeB could thus potentially provide approximately 40 bits of data transmission in the DCI message. Other examples could be possible as well.

In practice to facilitate this when the eNodeB has an amount of data for transmission to a UE, the eNodeB may determine whether the amount of data is less than (e.g., less than or equal to) a threshold amount. The threshold could be set based on capacity of the DCI message that would potentially carry the data, considering which fields of the DCI message the eNodeB would use for this purpose. For instance, with the examples above, on a 10 MHz carrier, the threshold amount might be set to 29 bits. Or even if just part of the Resource Assignment field and the MCS field would be used to carry data instead of scheduling PDSCH transmission of data, the threshold amount might be set to 19 bits or the like. Alternatively, the threshold could be set to some other level, based on one or more other factors. Other examples are possible as well.

The eNodeB may then operate accordingly. In particular, if the eNodeB determines that the amount of data it has for transmission to the UE is not less than the threshold amount, then the eNodeB may engage in the default process of scheduling the data for transmission on the PDSCH and accordingly transmitting the data on the PDSCH. In particular, the eNodeB would allocate PDSCH resources (e.g., one or more PRBs) to carry the data, the eNodeB would generate and transmit a DCI message specifying allocated PDSCH resources and perhaps a MCS, and the eNodeB would transmit the data on the specified PDSCH resources using the specified MCS. Whereas, if the eNodeB determines that the amount of data is less than the threshold amount, then the eNodeB may instead transmit the data within the DCI message, in place of the control information that would be provided in one or more of the defined fields of the DCI message as discussed above.

FIGS. 4A and 4B depict how this process could play out in a TTI like that shown in FIG. 2C. Both FIGS. 4A and 4B depict a DCI message 164 transmitted by the eNodeB in the control region 112, but the Figures show the different uses of the DCI message depending on whether the amount of data to be transmitted is less than (e.g., less than or equal to) the threshold amount. FIG. 4A depicts an instance where the amount of data is not less than the threshold amount, in which case the DCI message specifies allocated PDSCH resources (shown as two example PRBs 138, 140) and specifies an MCS for PDSCH transmission (shown as 16QAM by way of example), and the eNodeB provides the data transmission on the PDSCH in the specified PDSCH resources using the specified MCS. Whereas, FIG. 4B depicts an instance where the amount of data is less than the threshold amount, in which case the eNodeB provides the data transmission within the DCI message itself rather than allocating PDSCH resources for the data transmission and having the DCI message specify the allocated PDSCH resources and MCS.

Accordingly, when a base station such as eNodeB 12 has an amount of data for transmission over the air interface to a UE, the base station transmits to the UE on a TTI's PDCCH a DCI message. In doing so, the base station compares the amount of data with a threshold amount and, based on that comparison, selects between (i) transmitting the data on allocated resources of the TTI's PDSCH and specifying in the DCI message the allocated PDSCH resources, to enable the UE to read the data from the specified PDSCH resources, and (ii) transmitting the data within the DCI message, rather than on the TTI's PDSCH, to enable the UE to read the data from the DCI message. And the base station then operates in accordance with that selection.

In particular, if the amount of data is greater than the threshold amount, then the base station allocates PDSCH resources for carrying the data, and the base station (i) specifies in the DCI message the allocated PDSCH resources and a modulation scheme to be used transmission of the data on the specified PDSCH resources and (ii) transmits the data to the UE on the specified PDSCH resources using the specified modulation scheme. Whereas, if the amount of data is less than or equal to the threshold amount, then the base station does not allocate resources of the TTI's PDSCH for carrying the data, and the base station transmits the data to the UE in the DCI message rather than on the TTI's PDSCH.

In line with the discussion above, the DCI message could include at least one defined field. In that case, if the amount of data is greater than the threshold amount, then the base station could specify in the at least one defined field the allocated PDSCH resources and modulation scheme. Whereas, if the amount of data is less than or equal to the threshold amount, then the base station could transmit at least some of the data in the at least one defined field of the DCI rather than specifying in the at least one defined field of the DCI the allocated PDSCH resources and modulation scheme.

Further, the DCI message could include (i) a resource assignment field, (ii) a modulation and coding scheme field, (iii) a HARQ process number field, (iv) a new data indicator field, (v) a redundancy version field, (vi) a transmit power control command field, and (vii) a downlink assignment index field. And if the amount of data is less than or equal to the threshold amount, then the base station could transmit at least some of the data in each of one or more of those fields of the DCI message.

Figure 5:
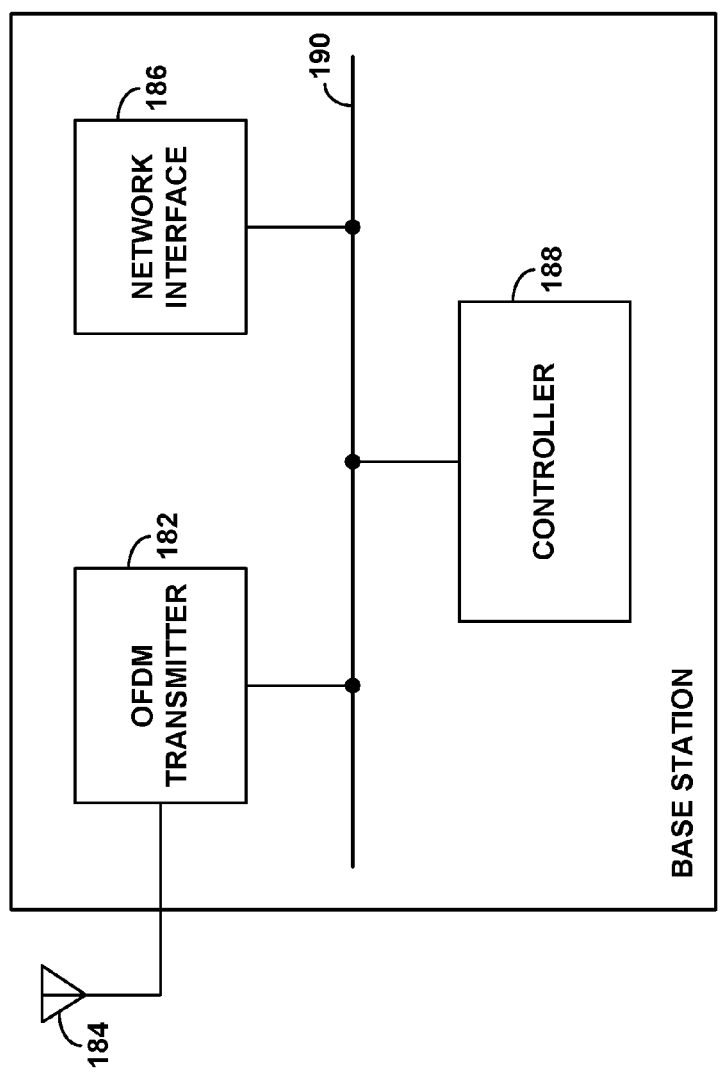
FIG. 5 is a simplified block diagram of an example base station operable in accordance with the disclosure.

FIG. 5 is next a simplified block diagram of an example cellular base station, showing some of the components of such a base station to facilitate operation in accordance with this disclosure. As shown in FIG. 5, the example base station includes an OFDM transmitter (transceiver) 182 and an associated antenna structure 184, as well as a network interface (backhaul interface) 186, and a controller 188, with various ones of these or other components being communicatively linked together by a system bus, network, or other connection mechanism 190 or perhaps integrated together to some extent.

OFDM transmitter 182 and antenna structure 184 may function in combination to provide an OFDM air interface as described above. As such, the OFDM transmitter 182 is configured to receive data, generate OFDM symbols from the data, and transmit the OFDM symbols on the air interface, and to define on the air interface various channels such as a PDCCH and PDSCH as discussed above. Network interface 186 may then comprise a wired and/or wireless network communication interface (such as an Ethernet interface) through which the base station may receive data over a backhaul connection that connects the base station to one or more entities of a wireless network, such as an SGW as discussed above for instance, for transmission of the data to one or more UEs served by the base station.

Controller 188, which may be integrated with OFDM transmitter 182 or one or more other components, may then control the transmission of data on the downlink air interface in line with the discussion above. For example, when the base station has an amount of data to transmit over the air interface to a UE in a TTI, the controller could cause the base station to transmit to the UE on the TTI's PDCCH a downlink control information (DCI) message. Further, based on a comparison between the amount of data and a threshold amount, the controller could make a selection between (i) causing the base station to transmit the data on allocated resources of the TTI's PDSCH and to specify in the DCI message the allocated PDSCH resources, so as to enable the UE to read the data from the specified PDSCH resources, and (ii) causing the base station to transmit the data within the DCI message, rather than on the TTI's PDSCH, so as to enable the UE to read the data from the DCI message. And the controller could cause the base station to operate in accordance with the selection.

Controller 188 could be implemented using hardware, software, and/or firmware. For example, controller 188 could include a processing unit (e.g., one or more processors) and a non-transitory computer readable medium (e.g., volatile and/or non-volatile memory) that stores machine language instructions or other executable program instructions. The instructions, when executed by the processing unit, may cause controller 188, and thus the base station, to carry out the various base station operations described herein.

Figure 6:
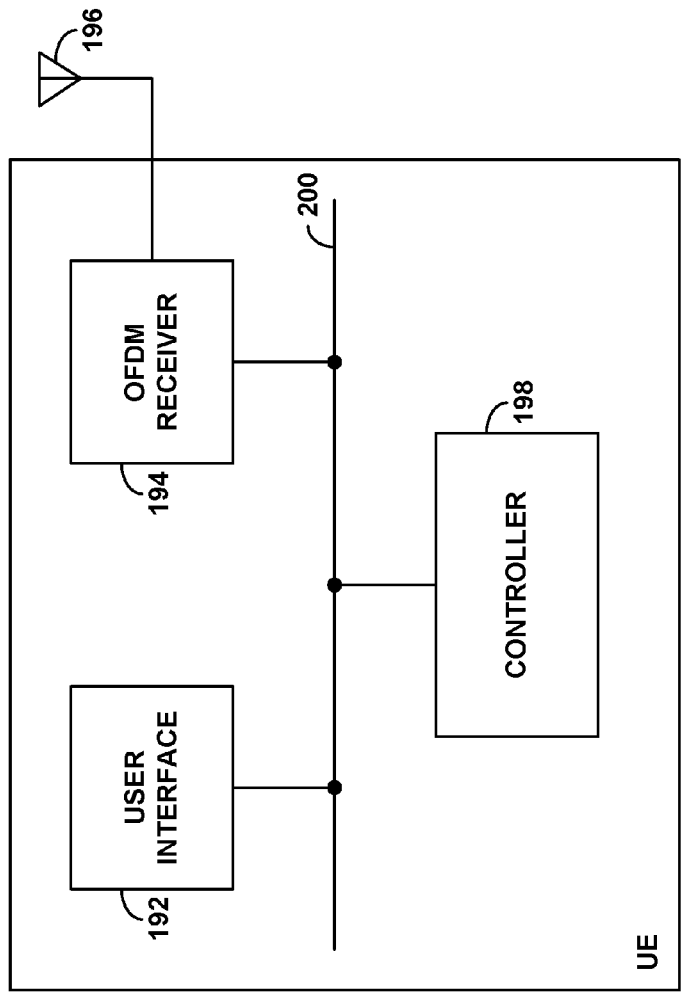
FIG. 6 is a simplified block diagram of an example UE operable in accordance with the disclosure.

Finally, FIG. 6 is a simplified block diagram of an example UE, showing some of the components of such a UE to facilitate operation in accordance with this disclosure. As shown in FIG. 6, the example UE includes a user interface 192, an OFDM receiver (transceiver) 194 and an associated antenna structure 196, and a controller 198, with various ones of these or other components being communicatively linked together by a system bus, network, or other connection mechanism 200.

User interface 192 may include input and output components to facilitate interaction with a user, if the UE is a user-operable device. OFDM receiver 194 and antenna structure 196 may then function in combination to engage in OFDM air interface communication with a cellular base station such as that described above. As such, the OFDM receiver 194 may be configured to receive OFDM communications on an air interface as described above, including for instance PDCCH communications and PDSCH communications. And controller 198, which may be integrated with OFDM receiver 194 or one or more other components, may control the processing of received communications, to carry out various UE operations described herein.

Exemplary embodiments have been described above. Those skilled in the art will understand, however, that changes and modifications may be made to these embodiments without departing from the true scope and spirit of the invention.

We claim:

1. In a wireless communication system in which a base station is configured to serve user equipment devices (UEs) via an air interface that spans a frequency bandwidth and that defines over time a sequence of transmission time intervals (TTIs), wherein each TTI defines a physical downlink shared channel (PDSCH) and a physical downlink control channel (PDCCH), a method for controlling transmission in a TTI, the method comprising:

when the base station has an amount of data for transmission over the air interface to a UE, transmitting by the base station to the UE on the TTI's PDCCH a downlink control information (DCI) message, wherein the DCI message includes defined fields selected from the group consisting of (a) a resource assignment field, (b) a modulation and coding scheme field, (c) a hybrid-automatic-repeat-request process number field, (d) a new data indicator field, (e) a redundancy version field, (f) a transmit power control command field, and (g) a downlink assignment index field;

based on a comparison between the amount of data and a threshold amount, selecting by the base station between (i) transmitting the data on allocated resources of the TTI's PDSCH and specifying in the DCI message the allocated PDSCH resources, to enable the UE to read the data from the specified PDSCH resources, and (ii) transmitting the data within at least one of the defined fields of the DCI message, rather than on the TTI's PDSCH, to enable the UE to read the data from the DCI message, wherein if the amount of data is greater than the threshold amount, then the base station selects the transmitting of the data on allocated resources of the TTI's PDSCH, and if the amount of data is less than the threshold amount, then base station selects the transmitting of the data within at least one of the defined fields of the DCI message; and operating by the base station in accordance with the selecting.

2. The method of claim 1, wherein operating by the base station in accordance with the selecting comprises:

if the amount of data is greater than the threshold amount, then allocating PDSCH resources for carrying the data, specifying in the DCI message the allocated PDSCH resources and a modulation scheme to be used transmission of the data on the specified PDSCH resources, and transmitting the data to the UE on the specified PDSCH resources using the specified modulation scheme; and if the amount of data is less than or equal to the threshold amount, then not allocating resources of the TTI's PDSCH for carrying the data, and transmitting the data to the UE in the DCI message rather than on the TTI's PDSCH.

3. The method of claim 2, wherein the at least one defined field of the DCI message comprises the resource assignment field and the modulation and coding scheme field, wherein if the amount of data is greater than the threshold amount, then the base station specifies in the resource assignment field and the modulation and coding scheme field of the DCI message the allocated PDSCH resources and modulation scheme, and wherein if the amount of data is less than or equal to the threshold amount, then the base station transmits at least some of the data in the resource assignment field and the modulation and coding scheme field of the DCI message rather than specifying in the resource assignment field and the modulation and coding scheme field of the DCI message the allocated PDSCH resources and modulation scheme.

4. The method of claim 3, wherein the DCI message is a DCI Format 1 message.

5. The method of claim 2, wherein the DCI message includes defined fields (a) through (g), and wherein if the amount of data is less than or equal to the threshold amount, then the base station transmits at least some of the data in each of one or more of the defined fields.

6. The method of claim 1, wherein the threshold amount is established based on capacity of the DCI message.

7. The method of claim 1, wherein the data is a machine-type-communication (MTC) packet.

8. In a wireless communication system in which a base station is configured to serve user equipment devices (UEs) via an air interface that spans a frequency bandwidth and that defines over time a sequence of transmission time intervals (TTIs), wherein each TTI defines a physical downlink shared channel (PDSCH) and a physical downlink control channel (PDCCH), a method for controlling transmission in a TTI, the method comprising:

when the base station has an amount of data for transmission over the air interface to a UE, transmitting by the base station to the UE on the TTI's PDCCH a downlink control information (DCI) message, wherein the DCI message includes defined fields selected from the group consisting of (a) a resource assignment field, (b) a modulation and coding scheme field, (c) a hybrid-automatic-repeat-request process number field, (d) a new data indicator field, (e) a redundancy version field, (f) a transmit power control command field, and (g) a downlink assignment index field;

comparing by the base station the amount of data with a threshold amount; and based on the comparing, controlling by the base station transmission of the data to the UE, wherein the controlling comprises:

if the amount of data is greater than the threshold amount, then (i) allocating resources of the TTI's PDSCH for carrying the data, (ii) specifying in the DCI message the allocated PDSCH resources, and (iii) transmitting the data to the UE on the allocated PDSCH resources, and if the amount of data is less than or equal to the threshold, then not allocating resources of the TTI's PDSCH for carrying the data, and transmitting the data to the UE in at least one of the defined fields of the DCI message rather than on the TTI's PDSCH.

9. The method of claim 8, wherein the at least one defined field of the DCI message comprises the resource assignment field, wherein specifying in the DCI message the allocated PDSCH resources comprises specifying in the resource assignment field the allocated PDSCH resources, and wherein transmitting the data within the DCI message comprise transmitting at least some of the data in the resource assignment field.

10. The method of claim 9, wherein the DCI message is a DCI Format 1 message.

11. The method of claim 8,
wherein the DCI message includes defined fields (a) through (g), and
wherein if the amount of data is less than or equal to the threshold amount, then the base station transmits at least some of the data in each of one or more of the defined fields.

12. The method of claim 8, wherein the threshold amount is established based on capacity of the DCI message.

13. The method of claim 8, wherein the data is a machine-type-communication (MTC) packet.

14. A base station configured to serve user equipment devices (UEs) via an air interface that spans a frequency bandwidth and that defines over time a sequence of transmission time intervals (TTIs), wherein each TTI defines a physical downlink shared channel (PDSCH) and a physical downlink control channel (PDCCH), the base station comprising:
an antenna structure for transmitting and receiving communications on the air interface; and
a controller configured to control air interface transmission by the base station,
wherein, when the base station has an amount of data to transmit over the air interface to a UE in a TTI, the controller causes the base station to transmit to the UE on the TTI's PDCCH a downlink control information (DCI) message, wherein the DCI message includes defined fields selected from the group consisting of (a) a resource assignment field, (b) a modulation and coding scheme field, (c) a hybrid-automatic-repeat-request process number field, (d) a new data indicator field, (e) a redundancy version field, (f) a transmit power control command field, and (g) a downlink assignment index field,
wherein, based on a comparison between the amount of data and a threshold amount, the controller makes a selection between (i) causing the base station to transmit the data on allocated resources of the TTI's PDSCH and to specify in the DCI message the allocated PDSCH resources, so as to enable the UE to read the data from the specified PDSCH resources, and (ii) causing the base station to transmit the data within at least one of the defined fields of the DCI message, rather than on the TTI's PDSCH, so as to enable the UE to read the data from the DCI message, wherein if the amount of data is greater than the threshold amount, then the controller selects the causing of the base station to transmit of the data on allocated resources of the TTI's PDSCH, and if the amount of data is less than the threshold amount, then the controller selects the causing of the base station to transmit the data within at least one of the defined fields of the DCI message, and
wherein the controller causes the base station to operate in accordance with the selection.

15. The base station of claim 14, wherein the controller comprises a processing unit, non-transitory data storage, and program instructions stored in the data storage and executable by the processing unit.

16. The base station of claim 14, wherein causing the base station to operate in accordance with the selection comprises:
if the amount of data is greater than the threshold amount, then allocating the resources of the TTI's PDSCH for carrying the data, causing the base station to specify in the DCI message the allocated PDSCH resources and a modulation scheme to be used for transmission of the data on the allocated PDSCH resources, and causing the base station to transmit the data on the specified PDSCH resource using the specified modulation scheme; and
if the amount of data is less than or equal to the threshold amount, then causing the base station to transmit the data to the UE in the DCI message rather than on the TTI's PDSCH.

17. The base station of claim 16,
wherein the at least one defined field of the DCI message comprises the resource assignment field and the modulation and coding scheme field,
wherein specifying in the DCI message the allocated PDSCH resources and modulation scheme comprises specifying in the resource assignment field and the modulation and coding scheme field the allocated PDSCH resources and modulation scheme, and
wherein transmitting the data within the DCI message comprise transmitting at least some of the data in the resource assignment field and the modulation and coding scheme field.

18. The base station of claim 17, wherein the DCI message is a DCI Format 1 message.

19. The base station of claim 16,
wherein the DCI message includes defined fields (a) through (g), and
wherein if the amount of data is less than or equal to the threshold amount, then the base station transmits at least some of the data in each of one or more of the defined fields.

20. The base station of claim 14, wherein the threshold amount is established based on capacity of the DCI message.

\* \* \* \* \*